(12) United States Patent
Lesbordes

(10) Patent No.: US 11,270,521 B2
(45) Date of Patent: Mar. 8, 2022

(54) CREATION OF A SIMULATION SCENE FROM A SPECIFIED VIEW POINT

(71) Applicant: ETAT FRANCAIS, Paris (FR)

(72) Inventor: Rémi Lesbordes, Toulouse (FR)

(73) Assignee: ETAT FRANCAIS, Paris (FR)

( * ) Notice: Subject to any disclaimer, the term of this patent is extended or adjusted under 35 U.S.C. 154(b) by 0 days.

(21) Appl. No.: 16/976,970

(22) PCT Filed: Mar. 1, 2019

(86) PCT No.: PCT/EP2019/055090
§ 371 (c)(1),
(2) Date: Aug. 31, 2020

(87) PCT Pub. No.: WO2019/166602
PCT Pub. Date: Sep. 6, 2019

(65) Prior Publication Data
US 2021/0005026 A1    Jan. 7, 2021

(30) Foreign Application Priority Data

Mar. 1, 2018    (EP) .................................... 18305218

(51) Int. Cl.
| | |
|---|---|
| *G06T 15/00* | (2011.01) |
| *G06T 19/20* | (2011.01) |
| *G06T 7/70* | (2017.01) |
| *G06T 3/40* | (2006.01) |
| *G06T 13/20* | (2011.01) |

(52) U.S. Cl.
CPC ............ *G06T 19/20* (2013.01); *G06T 3/4038* (2013.01); *G06T 7/70* (2017.01); *G06T 13/20* (2013.01); *G06T 2207/10032* (2013.01); *G06T 2219/2004* (2013.01)

(58) Field of Classification Search
CPC .................................................. G06T 19/006
See application file for complete search history.

(56) References Cited

U.S. PATENT DOCUMENTS

| | | | | |
|---|---|---|---|---|
| 2003/0218994 A1* | 11/2003 | Caminiti | ............... | H04W 16/18 370/316 |
| 2006/0239525 A1* | 10/2006 | Katayama | ............ | G02B 27/017 382/128 |

(Continued)

OTHER PUBLICATIONS

Izquierdo, et al., "Image-based rendering and 3D modeling: A complete framework", Signal Processing: Image Communication, vol. 15, Issue 10, pp. 817-858, Aug. 2000.
Balci, et al., "Sun position estimation and tracking for virtual object placement in time-lapse videos", Signal, Image and Video Processing, vol. 11, No. 5, pp. 817-824, Nov. 30, 2016.
Schmidt, et al., "Development of an Augmented Vision Video Panorama Human-Machine Interface for Remote Airport Tower Operation", Human Interface 2007: Human Interface and the Management of Information. Interacting in Information Environments, pp. 1119-1128, Jul. 22, 2007.

(Continued)

*Primary Examiner* — Charles Tseng
(74) *Attorney, Agent, or Firm* — BakerHostetler

(57) ABSTRACT

A creation of simulation scenes from a specified view point is provided. The method consists in obtaining digital photographic images of the scene from the specified view point, detecting objects in the digital photographic images, extracting masks of the object, and associating a distance to the digital photographic image, and a lower distance to the object. The scene thus created provides a photorealistic scene wherein 3D objects can be inserted. According to the distances of the 3D objects, they can be displayed behind or beyond the masks, but always behind the digital photographic images that defines the background of the scene.

13 Claims, 8 Drawing Sheets

(56) References Cited

U.S. PATENT DOCUMENTS

| | | | | |
|---|---|---|---|---|
| 2009/0040370 | A1* | 2/2009 | Varanasi | G01C 21/20 |
| | | | | 348/376 |
| 2012/0262485 | A1* | 10/2012 | Raghoebardajal | G06T 7/136 |
| | | | | 345/633 |
| 2014/0219572 | A1* | 8/2014 | Sassi | H04N 19/136 |
| | | | | 382/232 |
| 2015/0154745 | A1 | 6/2015 | Lafon et al. | |
| 2015/0279113 | A1* | 10/2015 | Knorr | G06T 15/50 |
| | | | | 345/633 |
| 2016/0086379 | A1* | 3/2016 | Sadi | G06F 3/013 |
| | | | | 345/633 |
| 2016/0217615 | A1* | 7/2016 | Kraver | G06F 3/04815 |
| 2018/0107874 | A1* | 4/2018 | Li | G06K 9/00637 |

OTHER PUBLICATIONS

Masotti, et al., "Augmented Reality in the Control Tower: A Rendering Pipeline for Multiple Head-Tracked Head-up Displays", Medical Image Computing and Computer-Assisted Intervention, pp. 321-338, Jun. 11, 2016.

Heartley, et al., "Multiple view geometry", Jun. 1999.

Lalonde, et al., "Estimating Natural Illumination from a Single Outdoor Image", International Journal on Computer Vision, pp. 183-190, Sep. 29, 2009.

Kim, et al., "A practical single image based approach for estimating illumination distribution from shadows", Tenth IEEE International Conference on Computer Vision (ICCV'05), vol. 1, pp. 266-271, Oct. 2005.

* cited by examiner

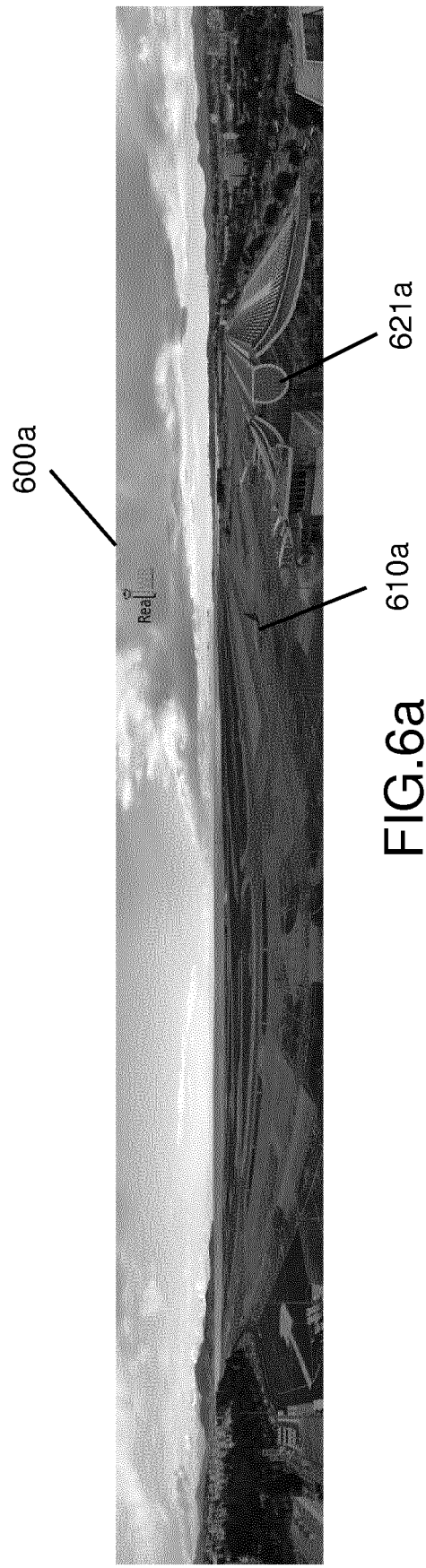
FIG.6a
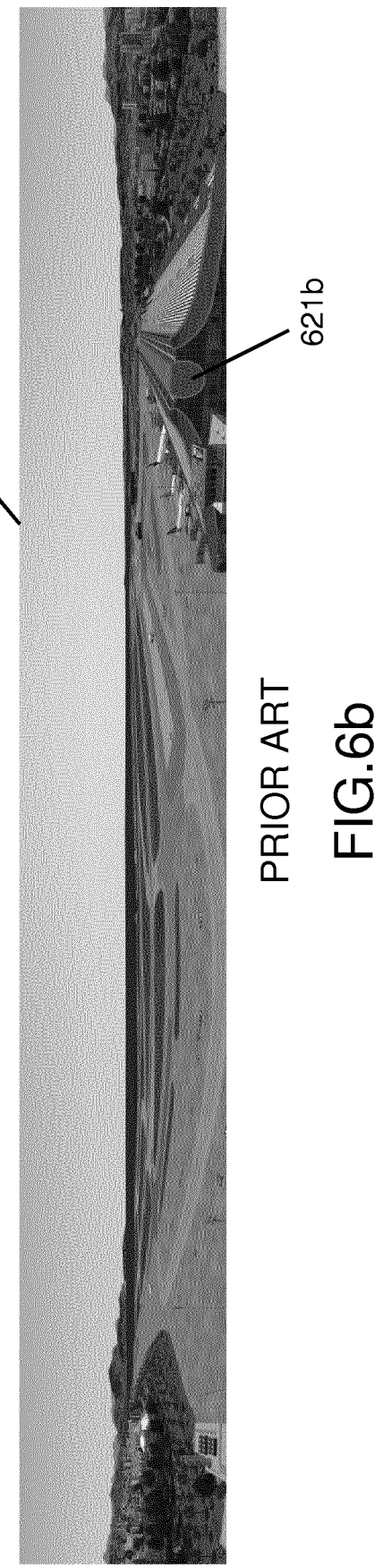
PRIOR ART FIG.6b

CREATION OF A SIMULATION SCENE FROM A SPECIFIED VIEW POINT

CROSS-REFERENCE TO RELATED APPLICATIONS

This application is a National Stage of International patent application PCT/EP2019/055090, filed on Mar. 1, 2019, which claims priority to foreign European patent application No. EP 18305218.2, filed on Mar. 1, 2018, the disclosures of which are incorporated by reference in their entirety.

FIELD OF THE INVENTION

The present invention relates to the field of simulation of 3D scenes. More specifically, it relates to the creation of digital simulation scenes from a specified view point.

BACKGROUND PRIOR ART 3D simulation provides a useful tool for simulating a variety of situations. In many cases, it is useful to simulate 3D scenes viewed from a specified point. For example, 3D scenes having a specified view point can be used for simulating airports control towers, for example to train air traffic controllers. In this case the specified view point is the control tower of an airport, and the simulation represents the airport, as viewed from the tower control, wherein 3D moving objects such as planes move according to the instructions of the air controller. 3D scenes thus provide a powerful tool for training and simulating a huge variety of situations.

3D scenes having a specified view point can also be used in other applications, for example to simulate harbors as seen from a control center, or cranes to train crane operators.

3D simulations are usually performed by simulating the state of a plurality of specified and mobile 3D objects defining the scene. A 3D rendering engine converts the 3D scene into a 2D video that represents the view as seen from the specified view point. Such kind of 3D simulations is very popular, because the point from which the scene is view can be changed. Such simulations are also often derived from 3D simulators that require full 3D modeling in order to change view point. For example, airport control tower simulators are derived from plane simulators, that need to model all objects in 3D in order to represent the scene from successive view points.

The creation of such a simulation scene requires the modeling of all objects of each scene in 3D. For example, when simulations are used to simulate the view from a control tower of an airport, all the elements of the airport (terminals, windsocks, signaling elements . . . ) need to be modeled in 3D. This is a cumbersome and extremely long task. For example, a skilled worker typically needs 2 or 3 month to model a single airport that does not present any excessive difficulty. Therefore, the number of airports available for simulation is limited. Moreover, such 3D modeling usually lacks details, and fails to provide a photorealistic rendering.

There is therefore the need for obtaining in a reasonable time 3D simulations scenes from a specified view point with photorealistic rendering.

SUMMARY OF THE INVENTION

To this effect, the invention discloses a method comprising: obtaining at least one digital photographic image of a view of a 3D real space; obtaining a position and an orientation of the digital photographic image relative to a specified view point; extracting from the at least one digital photographic image at least one mask representing at least one object having a specified position in the 3D real space in the at least one digital photographic image; associating to the mask an object distance between the object and the specified view point; associating to the digital photographic image a distance higher than the object distance; creating a digital simulation scene comprising the digital photographic image and the mask.

Advantageously, obtaining the orientation of the digital photographic image relative to the specified view point comprises: retrieving at least geographical coordinates of at least one fixed element from a database; detecting at least one position of the fixed element of said set in the digital photographic image; detecting an orientation of the digital photographic image according to: geographical coordinates of said fixed element; geographical coordinates of the specified view point; said position of said fixed element in the digital photographic image.

Advantageously, obtaining the orientation of the digital photographic image relative to the specified view point comprises: retrieving at least geographical coordinates of at least one fixed element from a database; identifying the fixed element in the digital photographic image; generating a synthetic representation of the fixed element; superimposing the synthetic representation on the digital photographic image at a position depending on geographical coordinates of said fixed element, and geographical coordinates of the specified view point; modifying the position and/or orientation of the digital photographic image, and performing a comparison of the respective positions of the fixed element and the synthetic representation of the fixed element in the digital photographic image, until the output of the comparison define that a stop criterion is met.

Advantageously, the method comprises associating to the mask the object distance: obtaining at least one aerial or satellite digital photographic image of the 3D real space comprising the specified view point and the object; detecting the specified position of the object in the 3D real space in the aerial or satellite digital photographic image; calculating the object distance according to the specified position of the object and the position of the specified view point in the aerial or satellite digital photographic image, and a resolution of the aerial or satellite digital photographic image.

Advantageously, the method comprises: obtaining a plurality of digital photographic images of the view forming a panorama around the specified view point.

Advantageously, said panorama is a 360° panorama.

Advantageously, the method comprises: obtaining timed series of digital photographic images of the view of the 3D real space; detecting the object as an object having the specified position and a changing appearance over the timed series of digital photographic images; extracting from each digital photographic image of the timed series timed masks representing the object in each digital photographic image of the timed series.

Advantageously, the method further comprises: forming an animated mask of the object using the series of timed masks.

Advantageously, the method comprises: creating an animated 3D object based on the timed masks; associating to the animated 3D object a distance between the specified view point and the object.

Advantageously, the method comprises: retrieving a 3D prototype of the animated 3D object, the layout of said 3D prototype being defined by one or more parameters; identifying values of said one or more parameters from the timed masks; adding to the digital simulation scene an instance of said animated 3D object as the application of the values of said one or more parameters to said 3D prototype.

Advantageously, the method comprises: obtaining a plurality of digital photographic images of the view; for each digital photographic image: obtaining a descriptor of a viewing condition; extracting a mask representing the object; associating the descriptor to the mask representing the object.

Advantageously, the method comprises: determining a light source position and a light source color of a light source representing the sun based on shadows in the digital photographic image; adding said light source having the light source color at the light source position in the digital simulation scene.

The invention also discloses a digital simulation scene comprising: at least one digital photographic image of a view of a 3D real space from a specified view point having a position and an orientation relative to the specified view point; at least one mask extracted from the at least one digital photographic image representing at least one object having a specified position in the 3D real space in the at least one digital photographic image; the mask having associated therewith an object distance between the specified view point and the object; the digital photographic image having associated therewith a distance higher than the object distance.

The invention also discloses a device comprising digital circuitry configured to: obtain at least one digital photographic image of a view of a 3D real space; obtain a position and an orientation of the digital photographic image relative to a specified view point; extract from the at least one digital photographic image at least one mask representing at least one object having a specified position in the 3D real space in the at least one digital photographic image; associate to the mask an object distance between the specified view point and the object; associate to the digital photographic image a distance higher than the object distance; create a digital simulation scene comprising the digital photographic image and the mask.

The invention also discloses a computer program product comprising computer code instructions configured to: obtain at least one digital photographic image of a view of a 3D real space; obtain a position and an orientation of the digital photographic image relative to a specified view point; extract from the at least one digital photographic image at least one mask representing at least one object having a specified position in the 3D real space in the at least one digital photographic image; associate to the mask an object distance between the specified view point and the object; associate to the digital photographic image a distance higher than the object distance; create a digital simulation scene comprising the digital photographic image and the mask.

The invention greatly decreases the time needed to create a simulation scene. For example, a simulation scene for an airport can be created by a skilled man in about one week using the invention, while it needed about 2 or 3 month using prior art methods.

The invention allows the creation of 3D scenes with photorealistic rendering.

The scenes created using the invention can be updated quickly to reflect changes in the real environment of the scene to be simulated.

A scene of the invention can use digital photographic images using different conditions (for example sun, rain day/night . . . ), in order to allow a photorealistic rendering corresponding to different viewing conditions.

The scenes of the invention allow a mix of 3D and 2D objects.

A scene created using the invention is compatible with existing 3D rendering engines.

BRIEF DESCRIPTION OF THE DRAWINGS

The invention will be better understood and its various features and advantages will emerge from the following description of a number of exemplary embodiments provided for illustration purposes only and its appended figures in which:

FIGS. 6a and 6b display two examples of rendering of a simulation scene from a specified view point, respectively in the invention and in the prior art;

DETAILED DESCRIPTION OF THE INVENTION

Figure 1:
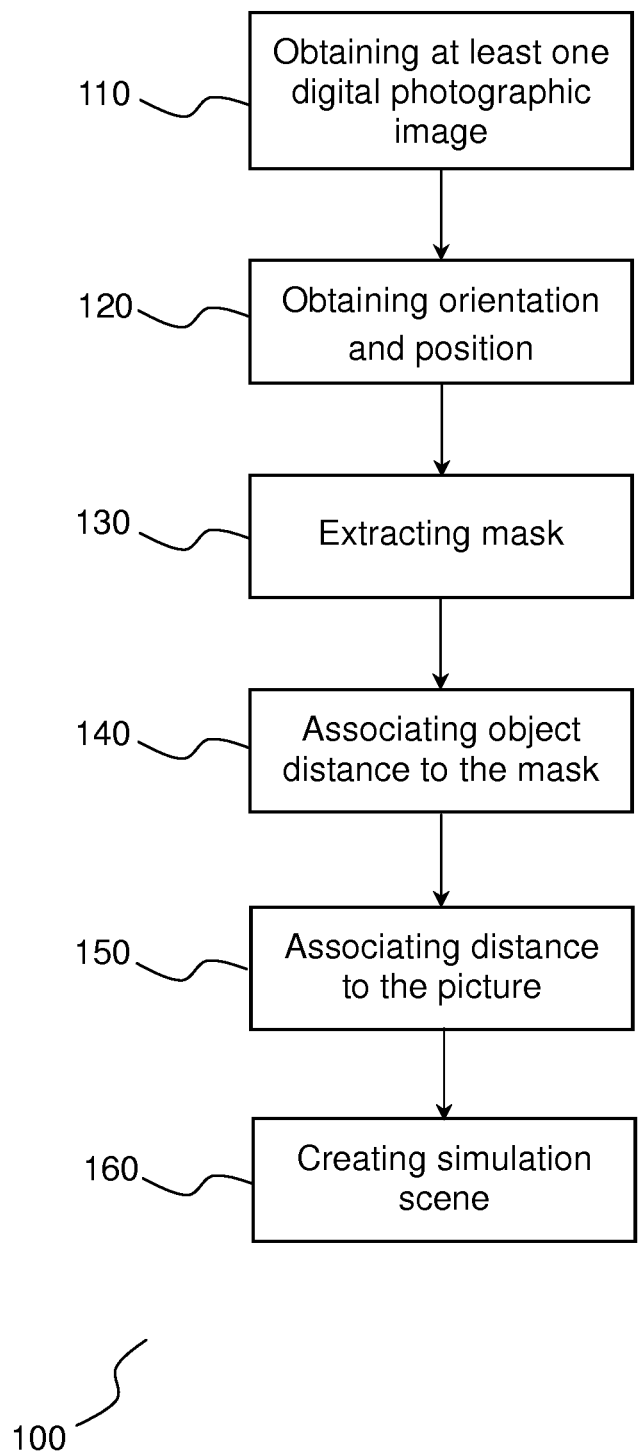
FIG. 1 displays an example of a method according to an number of embodiments of the invention.

FIG. 1 displays a method 100 according to a number of embodiments of the invention.

The method 100 is suited to create a digital simulation scene of a 3D real space from a specified view point. For example, the method can be used to simulate an airport as seen from a control tower, the specified view point being a view point within the control tower from which the air controllers view the airport and the 3D real space being the airport. The method 100 allows obtaining a digital simulation scene of the airport that can be used for example to train air controllers.

The specified view is a point which is specified as the point from which the simulation will be viewed. The specified view point may be defined literally, for example as "The control tower of the Toulouse-Blagnac airport", or may be defined using fixed coordinates, for example longitude-latitude-altitude coordinates.

The method 100 is not restricted to this example, and can be used for creating digital simulation scenes for a number of applications. For example, it may be used to create a digital simulation scene representing a harbor as seen from a control center, in order to train harbor controllers, or a view from a crane to train crane operators.

The method 100 comprises a step 110 of obtaining at least one digital photographic image of a view of a 3D real space.

According to a various embodiments of the invention, the step 110 may comprise obtaining at least one still digital photographic image, and/or at least one animated image, for example at least one video. A mix of still digital images, and videos may also be obtained.

The at least one digital image can be obtained from the specified view point. For example, an operator may be placed in the center of a control tower, and capture pictures and/or videos around him/her in order to obtain at least one digital image. In certain cases, it may be difficult or not desirable to obtain digital images from the specified view point. For example, capturing images from inside a control tower may not be desirable, because the interior of the control tower would also be captured. Furthermore, certain elements of the control tower, such as the borders of windows would prevent capturing images of entire parts of the 3D real space.

In such cases, the at least one digital image can be captured from points near the specified view point. For example, if the 3D real space is an airport, and specified view point is inside a control tower, they may be captured from the roof of the control tower, or from a gang way of the control tower.

In a number of embodiments of the invention, the step 110 consists in obtaining a plurality of digital photographic images of the view forming a panorama around the specified view point. This allows obtaining a photorealistic rendering around the specified view point, and create digital simulation scene wherein the user can rotate his/her angle of view to look in different directions.

In a number of embodiments of the invention, the panorama is a 360° panorama. This allows creating digital simulation scenes wherein the user can rotate on 360° to view the digital simulation all around him/her.

Figure 2:
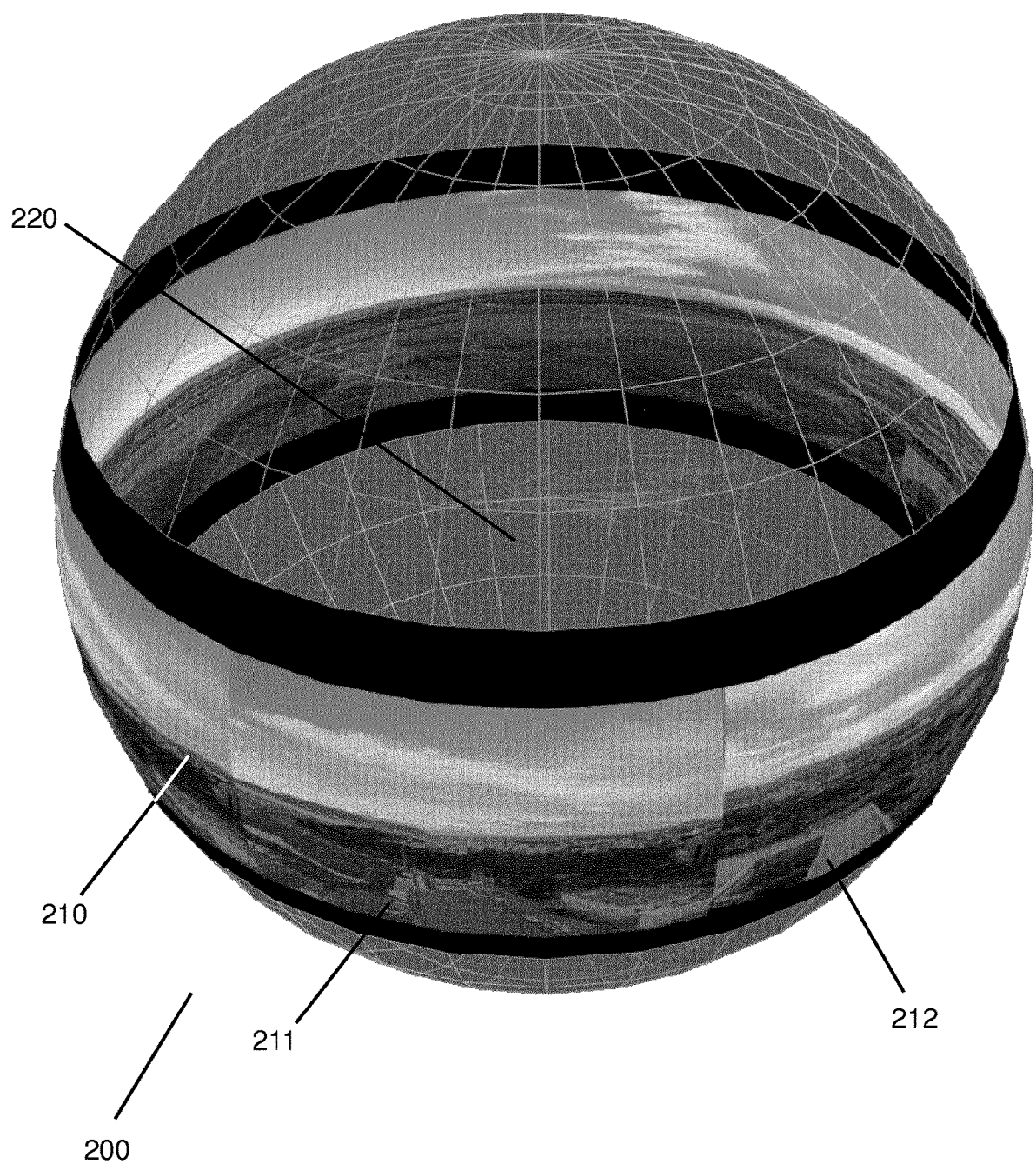
FIG. 2 displays an example of a set of digital photographic images of a scene from a specified view point forming a 360° panorama of the scene.

The FIG. 2 displays an example of a set of digital photographic images of a scene from a specified view point forming a 360° panorama of the scene.

The panorama 200 is formed of a plurality of digital photographic images 210, 211, 212 . . . . In this example the angles of capture of the digital photographic images have been tailored, so that the edges of the pictures exactly match, and the images form a 360° panorama around the specified view point 220. Such 360° panorama allows the creation of a digital simulation scene, wherein a user can look in any direction from the specified view point 220. This is provided by means of example only, and, in other examples, a panorama may be formed with the digital photographic images, that is not a 360° panorama. For example, the number of images available and/or their respective orientation may not be sufficient to create a 360° panorama.

In some embodiments of the invention, the digital photographic images 210, 211, 212 can also slightly overlap. In this case, many options are possible to create a panorama. For example, a digital image can be displayed on top of another, or the images may be progressively fused on the overlapping area.

Coming back to FIG. 1, the method 100 further comprises a step 120 of obtaining a position and an orientation of the digital photographic image relative to the specified view point.

Obtaining the position and orientation of the digital photographic image relative to the specified view point allows placing the digital photographic image in the right place in the digital simulation scene. It also allows placing the masks extracted from the digital photographic image in the right place.

The position and orientation may be expressed using any suitable convention. For example, they may be expressed using a 6D-position, that is to say a position formed of 3D position and 3D orientation. Alternatively, a position and an orientation can be determined. The position can be restricted to the relative vertical position of the image, which correspond to the relative vertical position of the point from which the digital photographic image was captured to the specified view point, or can be a 3D position, expressed for example in a 3D coordinate system x,y,z having the specified view point as origin. The vertical position relative to the specified view point is important, in order to display the digital photographic image, and masks extracted thereof, in the right place in the digital simulation scene. The orientation can be expressed using Euler angles in a reference frame centered on the specified view point, and represents the orientation used to capture the image.

The position and orientation of the digital photographic image (or, more specifically, the position of the point in which the image was captured, and the orientation of the capture) can thus be expressed in a reference frame centered on the specified view point. For example, the orientation can be expressed relative to the magnetic North.

These solutions are provided by means of example only, and any reference system that allows determining at least the vertical position of the point wherein the digital photographic image was captured, relative from the specified view point and the orientation used to capture a digital photographic image can be used.

Different methods can be used to determine the position and orientation of a digital photographic image. For example, a digital camera can be equipped with sensors, such as an altimeter, a GPS sensor, and a gyroscope, that allows a determination of the position and/or orientation of the image. It is then a straightforward task to express the position and orientation in a frame of reference of the specified view point.

However, many digital photographic images are not associated with such information, because most digital cameras are not equipped with such sensors. Moreover, the digital photographic images may be retrieved from various sources, from which it is not always possible to obtain reliable information relative to the position and/or orientation of the images.

In order to solve this issue, the position and orientation of a digital photographic image can be determined based on the position in the image of elements having known coordinates.

This can be performed by first retrieving geographical coordinates of at least one fixed element from a database. The at least one fixed element can be a fixed element with known coordinates that can be identified in the digital photographic image, for example runways or windsocks. For a digital simulation of a control tower of an airport, runways provide a very efficient solution. Indeed, the coordinates of runways are widely stored within runway databases, the runways are present all around an airport and may be identified in virtually any image captured from a control tower of an airport, and runways are easy to identify and locate in an image.

This can also be performed using other elements for digital simulations in different contexts. For example, if the digital simulation scene is a crane simulation to train crane operators, the fixed elements may be roads, whose positions can be found in Geo-referenced databases, and which can also be easily matched in digital photographic images.

Then, the position of a fixed element of said set can be detected in the digital photographic image. This may be performed either manually, for example by clicking on the position of the element and linking the position to an element with known coordinates, or automatically, for example by using an image recognition algorithm.

The orientation of the digital photographic image can thus be detected according to:
- geographical coordinates of said fixed element;
- geographical coordinates of the specified view point;
- said position of said fixed element in the digital photographic image.

More specifically, the position of the point from which the digital photographic image was captured can be calculated using a triangulation methods based on at least two fixed positions, and the angles between the position from which the digital photographic image was captured, and the fixed points.

This allows obtaining a position and/or orientation for any digital photographic image, provided that it contains elements having known geographical coordinates.

Alternatively, the position and orientation of the digital photographic image can be obtained by:
- retrieving at least geographical coordinates of at least one fixed element from a database; this step is identical as indicated above. According to various embodiments of the invention, the fixed element can be on the ground (in this case the geographical coordinates can comprise only latitude/longitude or equivalent coordinates), or the altitude of the fixed element can also be retrieved in order to locate an element above the ground;
- identifying the fixed element in the digital photographic image; this step can be performed either manually, by visually inspecting the digital photographic image, and visually identifying one of the fixed element, for example a runway of a windsock;
- generating a synthetic representation of the fixed element; such synthetic representation may be for example runways represented as coloured lines;
- superimposing the synthetic representation on the digital photographic image at a position depending on geographical coordinates of said fixed element, and geographical coordinates of the specified view point; the superimposition of the synthetic representation to the digital photographic image consists in superimposing, on the digital photographic image, the synthetic representation of the fixed element in the position it should have in the picture;
- modifying the position and/or orientation of the digital photographic image, and performing a comparison of the respective positions of the fixed element and the synthetic representation of the fixed element in the digital photographic image, until the output of the comparison define that a stop criterion is met. This step consists in modifying the position and/or orientation of the digital photographic image, so that the representation of the digital photographic image, and/or synthetic representations superimposed on the image are displaced, until the positions of the fixed elements in the digital photographic image match the synthetic representations superimposed on the image. In a number of embodiments of the invention, other parameters of the image, such as the scale or aspect ratio of the image. This may be performed manually, by visually placing the digital photographic image until the positions of the fixed elements match the synthetic representation. This may also be performed automatically, for example by iteratively displacing the digital photographic image and/or synthetic representations, and calculating a score of correlation, in order to obtain the best possible score of correlation.

This also allows a determination of the position and orientation of the digital photographic image, even without having any a priori knowledge thereof.

Figure 3:
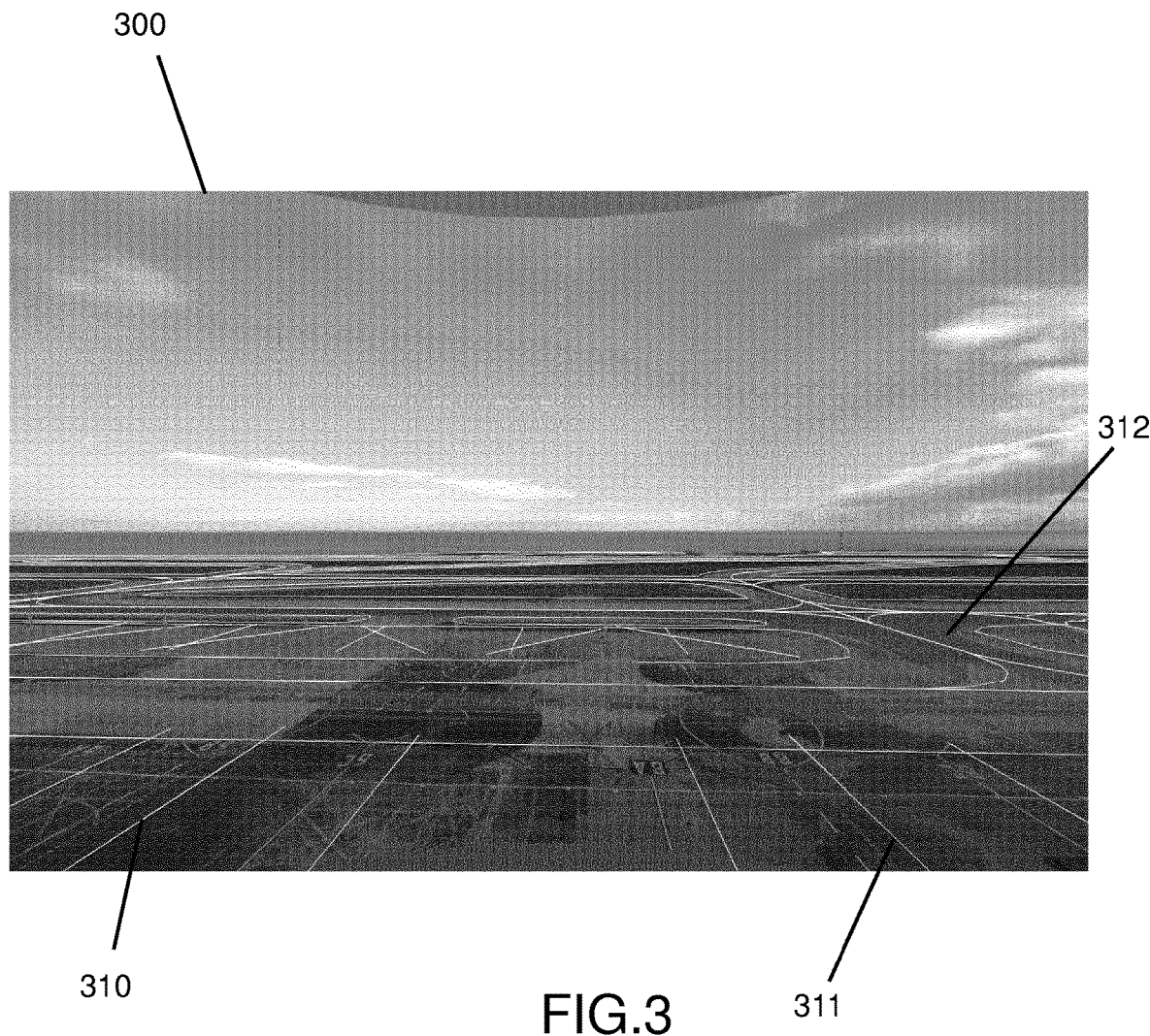
FIG. 3 displays an example of determination of the position and orientation of a digital photographic image with respect to a specified view point in an example of embodiment of the invention.

The FIG. 3 displays an example of determination of the position and orientation of a digital photographic image 300 with respect to a specified view point in an example of embodiment of the invention.

In this example, the digital photographic image is a picture captured from the control tower of the Nice airport. The digital photographic image is displayed in a position of the screen corresponding for example to an initial position and orientation of the digital photographic image.

In order to determine the exact position and orientation of the digital photographic image, the positions of the runways are retrieved from a runway database, and synthetic elements representing the runways, in this case colored lines such as the lines 310, 311, 312 are superimposed on top of the image. The colored lines 310, 311 and 312 are displayed at the place where they would be seen from the specified point of view, when the user looks in a given orientation.

The position and orientation of the digital photographic image is then adjusted, in order that the runways which actually appear in the digital photographic image overlap as much as possible the synthetic elements 310, 311, 312 . . . . As noted above, this can be performed manually, by a user adjusting the position and orientation of the digital photographic image in order that the positions of the synthetic elements visually match the runways in the digital photographic image, the representation of the synthetic elements and/or the digital photographic image being adjusted each time the position and/or orientation of the digital photographic image is modified.

This can also be performed automatically, by iteratively modifying the position and/or orientation of the digital photographic image, and calculating a matching score according to the positions of the runways in the digital photographic images and the synthetic representation. In this case, the determination of the position and orientation of the digital photographic image can be performed fully automatically, and it is not even necessary to actually display the digital photographic image.

As noted above, the runways provide a very efficient tool to determine the position and orientation of the image, because runway databases provide a reliable source of positions of the runways, for virtually any airport in the world, and runways can be visually identified and matched in the digital photographic images very easily.

Coming back to FIG. 1, the method 100 further comprises a step 130 of extracting from the at least one digital photographic image at least one mask representing at least one object having a specified position in the 3D real space in the at least one digital photographic image.

The at least one object can be any object having a specified position in the 3D real space, that may be separated from the background of the digital photographic image. For example, such object may be windsock, a hangar . . . that is to say any object that has a specified position and may be separated from the background of the image.

According to various embodiments of the invention, masks can be extracted for as many objects as possible, and one or more masks can be extracted for each object. An object having a specified position in the 3D real space may be detected either manually, or automatically, for example by executing object recognition algorithms on the digital photographic image.

A mask may be extracted in different ways. For example, a mask may be extracted by manually defining the borders of the corresponding object in the digital photographic image. A mask may also be extracted, by automatically determining the borders of the object in the digital photographic image.

As will be explained in more details below, the masks define objects that can be placed at different distances within the digital simulation scene, while the parts of a digital image that do not belong to any mask form the background of the digital simulation scene. Therefore, 3D objects can be placed in the digital simulation scene behind or below the masks depending on their distance to the specified point of view, while the background parts of the digital photographic images are always placed in the background of the digital simulation scenes.

In a number of embodiments of the invention, a digital photographic image is a single, still image. In other embodiments of the invention, a digital photographic image can be part of timed series of digital photographic images of the view of the 3D real space, for example a video. Such timed series may be obtained for example by capturing successive images of the 3D real space with the same orientation, or capturing a video of the 3D real space.

In such embodiments of the invention, some masks may be animated masks. For example, an animated mask can be used to represent an animation of a windsock, in order to obtain a more realistic and interactive digital simulation scene.

Such animated mask can be obtained by:
detecting the object as an object having the specified position and a changing appearance over the timed series of digital photographic images; this can be performed for example by visually inspecting the timed series of digital photographic image, and identifying objects that have a changing appearance around images. A changing appearance may correspond for example to changing colors and/or changing shapes. This may also be performed automatically, by detecting separately on each image objects having a defined position in the 3D real space, and verify of the texture or shape of the object change over the successive images of the timed series;
extracting from each digital photographic image of the timed series timed masks representing the object in each digital photographic image of the timed series. This step consists in extracting, on each image, a timed mask of the object. The timed masks can be extracted as explained above. According to various embodiments of the invention, the timed series of timed masks may be formed either of masks having the same shape, or masks having different shapes. For example, if a timed series of timed masks represents successive images of a windsock, the windsock may have different shapes over time: for example, the windsock may be either tensed by wind, or pendulous. Thus, the windsock may be represented by masks having different shapes in order to represent the different shapes of the windsock.

The series of timed masks can thus by used to form an animated mask, in the form of successive timed masks, or in the form of a video. As explained above, an animated mask enriches the content of a digital simulation scene and provides a better sensation of immersion, because objects that are supposed to be dynamic, such as windsocks, are indeed represented dynamically.

It is also possible to create an animated 3D object based on the timed masks. The animated 3D object can be an object representative of the object having the specified position. The creation of the animated 3D object can be for example performed by identifying, based o the timed masks, parameters of a prototype 3D object. For example, a prototype of 3D windsock may be parameter by parameters such as the height or the color of the windsock. It is possible to identify, for a given windsock, the value of such parameters from the timed masks (for example, the height of the windsock may be determined based on the vertical number of pixels of a mask, and the color of the windsock may be identified based on the colors represented by the pixels of the mask), and create a 3D object by setting the values of the prototype 3D object to the above mentioned identified values.

The method 100 further comprises a step 140 of associating to the mask an object distance between the object and the specified view point.

The object distance represents the distance between the specified view point, from which the object shall be viewed in the digital simulation scene, and the object represented by the mask. Such distance thus allows, when playing the scene, to determine if a 3D object shall be represented behind or beyond the mask, depending on a comparison of the distance between the specified view point and the 3D object, and the object distance.

The object distance may be determined in different ways. For example, a size of the object in the 3D real space may be estimated, and the object distance may be calculated using the size of the object in the digital photographic image, and the size of the object in the 3D real space. Indeed, an object having a given dimension will be represented by a number of pixels that is dependent upon the distance between the object and the point of view. For example, the number of pixels used to represent the object is lower when the distance between the object and the point of view is higher. For example, if the resolution of the camera that captured the digital photographic image is known, the size in pixels of the object in the digital photographic image can be converted in an angular size, then the object distance can be calculated as the inverse tangent of the angular size multiplied by the size of the object in the real 3D space. The size of the object in the 3D real space may be obtained in different ways. For example, if the object has a standard size, the standard size of the object can be retrieved as the size of the object in the 3D real space. Some objects may also have a well-defined size. For example, the size of a hangar in an airport may be retrieved from a plan of the airport.

The object distance may also be determined using a 3D scanner.

In some cases, it may be difficult to calculate an object distance from a single digital photographic image. It may for example be the case, if the size of the object in the 3D real space cannot be obtained, or if the information associated with the digital photographic picture, such as the angular resolution of the camera that captured the image, is lacking.

Other methods exist to determine the object distance. For example, if an object is present in at least two digital photographic images captured from two different points, the specified position of the object can be determined using a triangulation method, and the object distance can be calculated as the distance between the position of the specified view point, and the position of the object.

The object distance can also be calculated by:
obtaining at least one aerial or satellite digital photographic image of the 3D real space comprising the specified view point and the object. Such aerial or satellite image can be obtained for example using the Google Earth™ service, or using any other database of aerial or satellite image. A single image, or a combination or mosaic images may be used, provided that both the specified view point, and the object, are located in the same image, or set of images. Usually a single satellite image is sufficient because satellite images usually cover a very large area, while mosaic of image are more frequently used for aerial images;

detecting the specified position of the object in the aerial or satellite digital photographic image; This can be performed manually, by indicating the specified position of the object in the aerial or satellite digital photographic image. This may also be performed automatically, for example by using image matching algorithms between the aerial or satellite image, and the at least one digital photographic image. If it is not already known, the position of the specified view point can be identified similarly in the aerial or satellite image. For example, if the specified position is in a control tower of an airport, the control tower of the airport can be manually or automatically detected in the aerial or satellite image;

calculating object distance according to the specified position of the object and the position of the specified view point in the aerial or satellite digital photographic image, and a resolution of the aerial or satellite digital photographic image. This may be performed by first calculating a distance, in pixels, between the position of the specified view point and the specified position of the object, then converting this distance using the resolution of the aerial or satellite image, for example in meters.

The method described above allows determining the object distance in virtually any case of outdoor 3D real space whatever the source of the digital photographic image, because aerial or satellite images are now widely available and cover virtually any place on Earth.

Although the methods to determine object distance have been described with respect to still image masks, they can be used similarly to determine an object distance for a 3D or animated 2D mask.

Figure 4A:
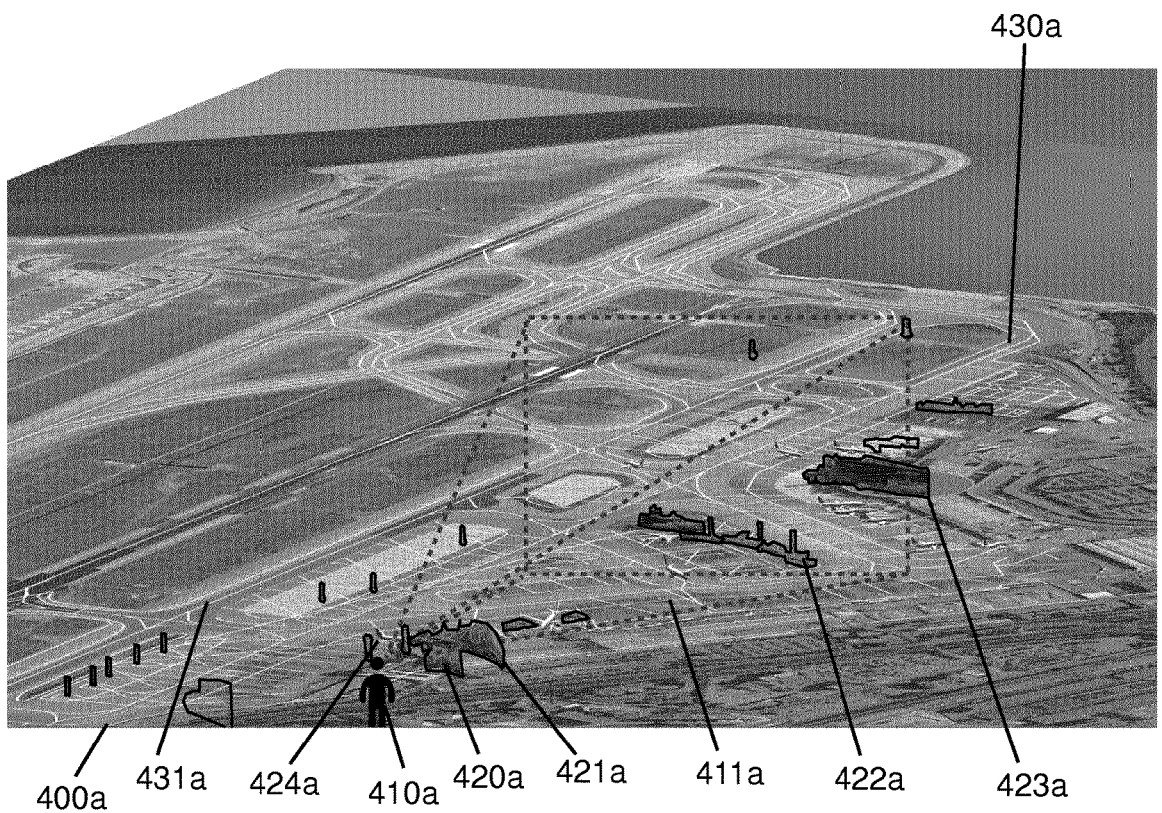
FIGS. 4a to 4c display a example of determination of the distances of masks from a specified view point in a number of embodiments of the invention.
Figure 4B:
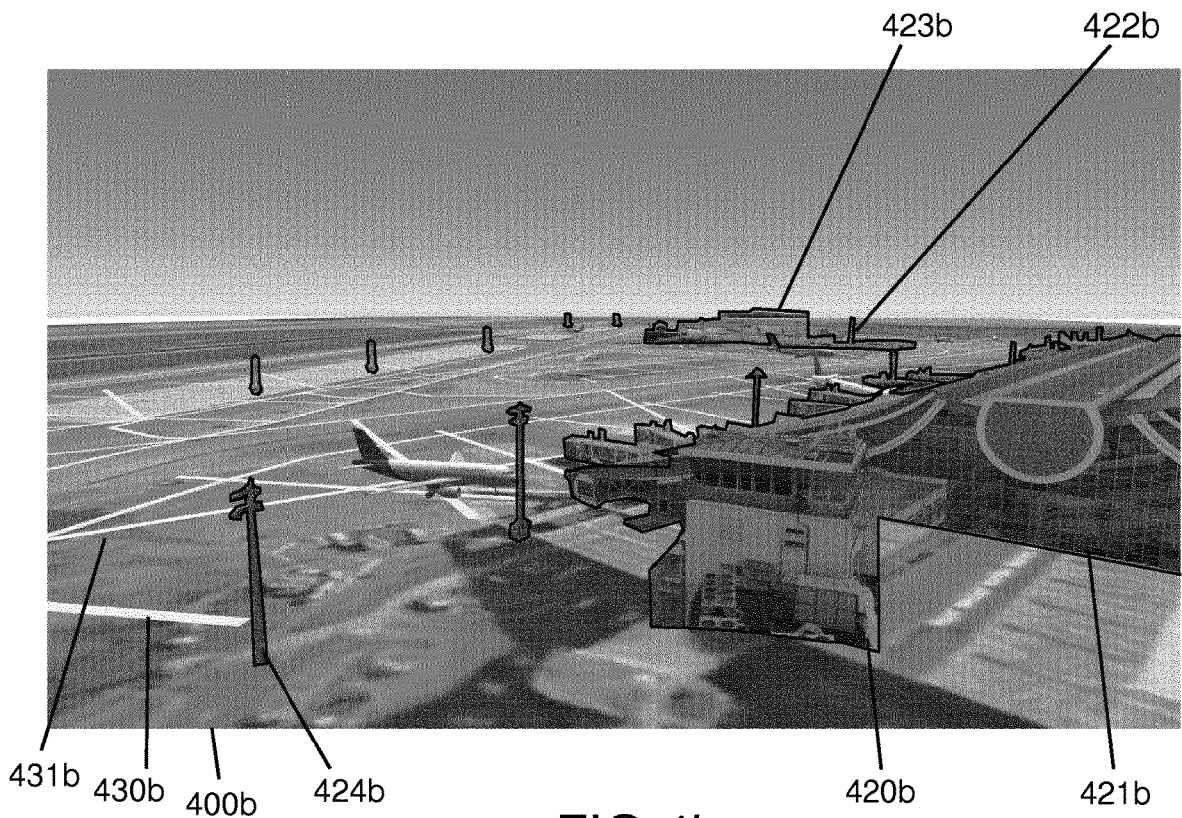
Figure 4C:
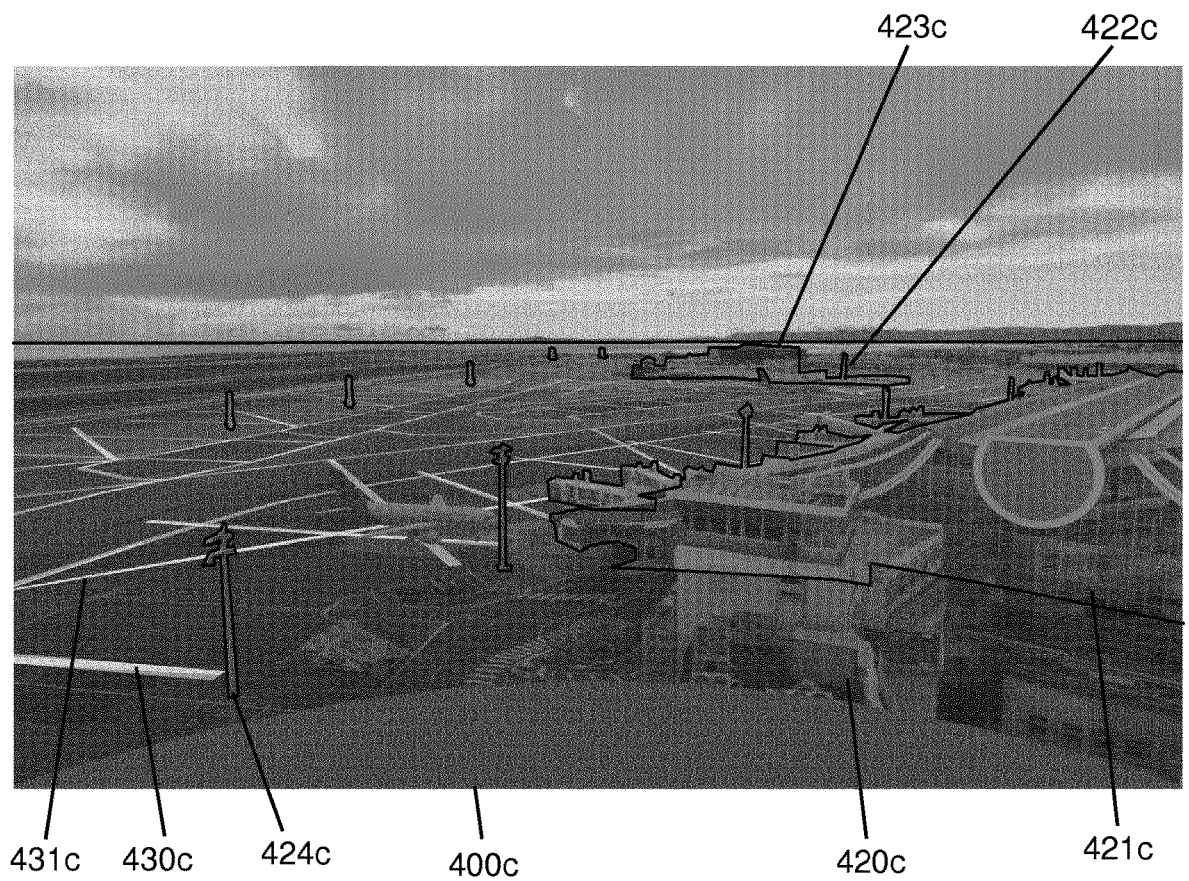

FIGS. 4a to 4c display an example of determination of the distances of masks from a specified view point in a number of embodiments of the invention.

In the example of FIGS. 4a to 4c, the digital photographic images and satellite digital photographic images are images of the Nice airport. However the method described with reference to FIGS. 4a to 4c can be used for creating simulation scenes of any airport or environment.

In FIG. 4a, a satellite digital photographic image 400a of the Nice airport comprises the specified point of view 410a, which is the control centre of the control tower of the Nice airport. The pyramid 411a represents the orientation of a digital photographic image from which a plurality of masks, for example the masks 420a, 421a, 422a, 423a or 424a have been extracted. Each mask represents an element, or building, of the airport. A user can displace visually masks, until their position in the satellite photographic image 410a matches the corresponding element or building represented in the image 400a. This allows an identification of the actual position of the mask, since any position in the satellite digital photographic image 400a can be converted into positions in an absolute frame of reference, for example latitude-longitude positions. The runways can be superimposed as synthetic elements 430a, 431a in order to further enhance the placement of the masks. The position of the synthetic elements 430a, 431a representing the runways are defined according to runway positions from runway databases.

In FIG. 4b, in order to further refine the positions of the masks, the satellite digital image is displayed 400b on the ground, from the specified point of view 410a. The masks are displayed 420b, 421b, 422, 423b, 424b where they are intended to be seen depending on their position/distance from the specified point of view. The combined view of the satellite digital image 400b, and the masks 420b, 421b, 422b, 423b and 424b allows a finer positioning of the masks. A user can thus use the representation of FIG. 4b to further refine the positions of the masks. The runways can be superimposed as synthetic elements 430b, 431 b . . . in order to further enhance the placement of the masks.

In FIG. 4c, the same masks are displayed 420c, 421c, 422c, 423c, 424c, as well as the runways in superimposition 430c, 431c. However, these are represented on top of the digital photographic image 400c from which the masks are extracted. This allows a further verification that the positions of the masks are correct. Here again, the user can adjust the positions of the masks, in order that they are represented in the most relevant position.

Coming back to FIG. 1, the method 100 further comprises a step 150 of associating to the digital photographic image a distance higher than the object distance. This distance is a distance corresponding to a background, because the parts of the digital photographic images that are not mask define a background of the 3D simulation scene. This distance can be for example to a predefined distance higher than the distance of any object to be represented in the 3D simulation scene. Any distance can be associated to the digital photographic image, provided that the digital photographic image will be represented as a background behind any 3D object to be represented in the 3D digital simulation scene.

The method 100 further comprises a step 160 of creating a digital simulation scene comprising the digital photographic image and the mask.

The digital simulation scene thus encompasses the digital photographic images and masks having distances to the specified view point associated therewith. For example, a digital simulation scene may comprise a set of digital photographic images forming a panorama such has the panorama 200, and masks extracted therefrom. Such a simulation scene thus allows representing the digital photographic images as a background of the simulation scene, and 3D objects behind or beyond every mask, depending on their respective distances to the specified view point. Thus, such digital simulation scene provides a photorealistic rendering of the background and fixed elements, while providing the ability to represent any 3D dynamic object in the scene, such as a plane in an airport. Furthermore, the method 100 can be used to create a 3D simulation scene much faster than prior art methods of creating full 3D simulation scenes.

The digital photographic images and masks comprise shadows that render them photorealistic. However, in order to provide a fully realistic effect to the scene, the 3D objects that are inserted to the scene should create shadows that are consistent with the shadows that are displayed on the digital photographic images.

In order to do so, a horizontal transparent plane can be added to the digital simulation scene. Such a plane will not be seen by itself, but, when rendering the digital simulation scene, 3D objects will project shades on the transparent plane. The transparent plane can thus be placed at a position corresponding to the ground. Such a plane is commonly called "matte shadow material" in the field of 3D simulation.

The creation of shades that are consistent with those of the digital photographic images also require that a light source is inserted in the digital simulation scene at a location and with a color that roughly correspond to the orientation of the sun and color of the color of sunlight when the digital photographic images were captured.

In a number of embodiments of the invention, the method 100 thus comprises a step of determining a light source position and a light source color of a light source representing the sun based on shadows in the digital photographic image, and adding said light source having the light source color at the light source position in the digital simulation scene.

A number of different embodiments are possible to determine the light source color and light source position. For example, the light source color may be deduced from the color of one of more shades one or more digital photographic images. The light source color may be determined according to various conventions. For example, the light source color may be determined as a RGB or YUV triplet, or by parameters such as light temperature and light hue.

The light position may be determined by calculating an orientation of the sun from the shadows in a digital photographic image, and defining the position of the light source as a predefined distance in the direction of the orientation of the sun.

Figure 5:
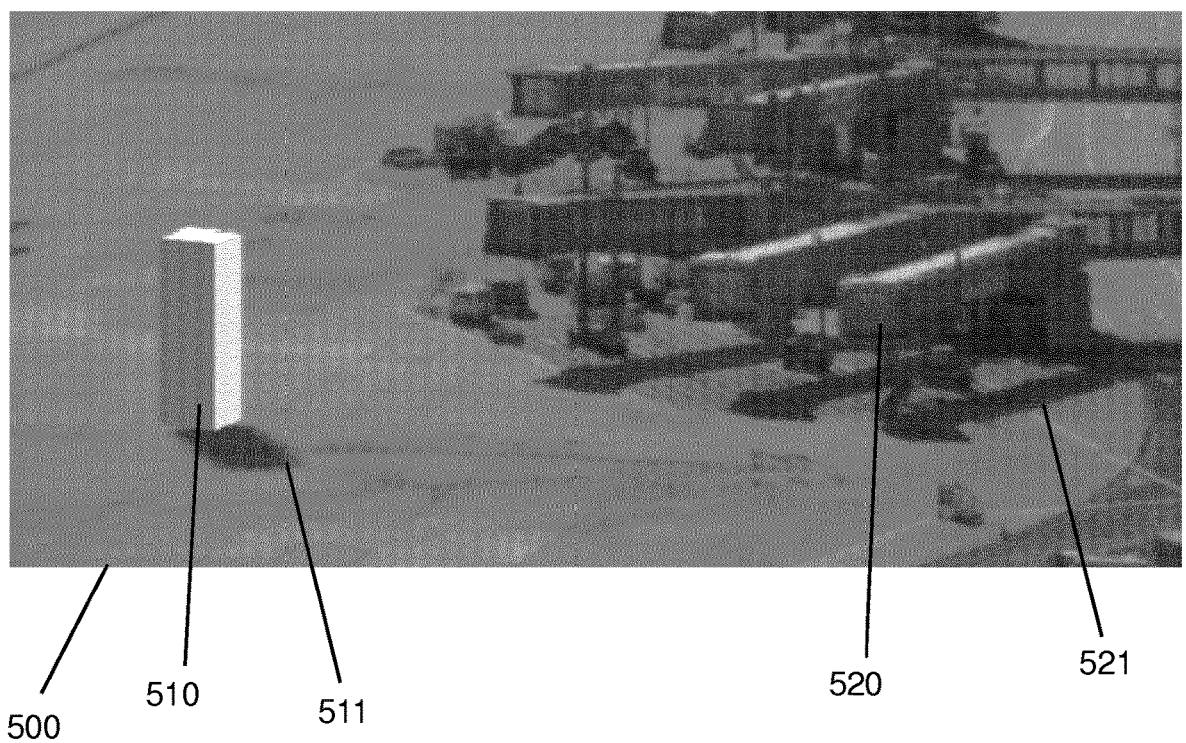
FIG. 5 displays an example of determination of a light source position and light source color of a light source to be added to a digital simulation scene in a number of embodiments of the invention.

FIG. 5 displays an example of determination of a light source position and light source color of a light source to be added to a digital simulation scene in a number of embodiments of the invention.

The view 500 displays a zoom in a digital photographic image to be used in the digital simulation scene. Different objects are present in the digital photographic image, for example the passenger exit 520 that projected a shadow 521 on the ground when the digital photographic image was captured.

In order to determine the light source color and light source position, an artificial object 510 can be placed in the digital simulation scene, and a light source created with an initial light source color and light source position; the light source makes the artificial object 510 project a shadow 511 on a horizontal transparent plane. The light source position and light source color can thus be modified, so that the shadow 511 is consistent with the shadow 521, that is to say the simultaneous view of the shadows created by the 3D objects and the shadows that were present in the digital photographic images seems natural.

In order to do so, the light source position and light source color can be modified manually, in order that the shadow 511 is visually consistent, in terms of size, orientation and color, with the shadow 521. The light source position can also be modified automatically, for example by a machine learning algorithm trained to detect shadows and their characteristics, and modify the light source position and light source color, in order that the shadow 511 and shadow 521 have similar characteristics.

These embodiments provide the advantage of allowing the determination of light source position and light source color that will let the 3D object in the digital simulation scene produce shadows consistent with the shadows in the digital photographic images, whatever the conditions in which the digital photographic images were captured.

Coming back to FIG. 1, the digital simulation scene can be stored in many different ways. For example, it can be stored in 3D file formats that use textured images such as .fdx, .3ds, .3dsmax formats. Such 3D files can be played by known 3D rendering engines.

In a number of embodiments of the invention, a single simulation scene can be represented in different viewing conditions. A viewing condition can be defined as any parameter that has an impact on the view, such as the weather, season, time of the day, orientation of the sun.

In order to allow a representation of the digital simulation scene according to different viewing conditions, the method 100 may comprise:
  obtaining a plurality of digital photographic images of the view;
  for each digital photographic image:
    obtaining a descriptor of a viewing condition;
    extracting a mask representing the object;
    associating the descriptor to the mask representing the object.

The digital photographic images may be captured specifically for different viewing conditions. For example, they may be captured at different times of the days, different seasons, under different weathers such as rainy, sunny, cloudy or snow weathers. Many other parameters, such as the position of the sun, may be used.

The extraction of the masks can be performed in the same way as explained above. Therefore, the view can comprise a set of digital photographic images of the view, and masks representing various objects, according to different viewing conditions. For example, an example of a digital photographic image, and masks extracted thereof, may be present for each season.

During rendering of the digital simulation scene, the masks or digital photographic images to represent may be selected, statically or dynamically in order to best match target viewing conditions. For example, if digital photographic images have been captured every 10 minutes for a whole day, the digital photographic images and masks may be switched every 10 minutes, in order for the digital simulation to be as realistic as possible. If digital photographic images and mask are present for different weathers, the images and masks that best match a current weather can be selected. For example, digital photographic images and masks corresponding to a rainy weather can be selected if the current weather at the specified view point is rainy.

The selection of the digital photographic images and masks according to the viewing conditions provides to a user a rendering which is as close as possible to the actual view of the 3D real space, and increases the sensation of immersion of the user in the 3D simulation scene.

FIGS. 6a and 6b display two examples of rendering of a simulation scene from a specified view point, respectively in the invention and in the prior art.

FIG. 6a displays an example of rendering of a simulation scene from a specified point as created in an embodiment of the invention. The digital simulation scene is a simulation scene of the Nice airport. The digital photographic images form a background 600a of the digital simulation scene. The masks, for example the mask 621a, and mobile device rendered in 3D, for example the plane 610a, are displayed on the foreground of the digital simulation scene. The 3D mobiles, such as the plane 610a, can be displayed behind or below each mask, depending upon their respective distance to the specified view point. A digital simulation scene created according to the invention thus provides a photorealistic rendering. In the example of FIG. 6b, the rendering is performed according to digital photographic images captured at dusk. It thus provides a photorealistic simulation of the Nice airport at dusk. However, it is possible to create digital simulation scenes according to digital photographic pictures captured in many other conditions, such as at night, in rainy or snowy weather, in order to provide a photorealistic rendering according to such conditions.

The FIG. 6b represents an example of rendering or a simulation scene according to the prior art. The scene 600b is created as a full 3D simulation, each element or building of the airport being entirely modeled in 3D. FIG. 6b displays a rendering 600b of a digital simulation scene of the same Nice airport. For example, the hangar 621b corresponds to the mask 621a but has been created in 3D. The rendering 600b according to the prior art is not photorealistic, and provides a very low level of details. In addition, such digital simulation scene according to the prior art is much longer to create than a digital simulation scene according to the invention, because each and every element has to be modeled in 3D.

These examples demonstrate the ability of the invention to create photorealistic digital simulation scenes in an exemplary airport. However, they are provided by means of example only, and the invention may be applicable to digital simulation scenes representing any kind real 3D space from a specified point of view.

Figure 7:
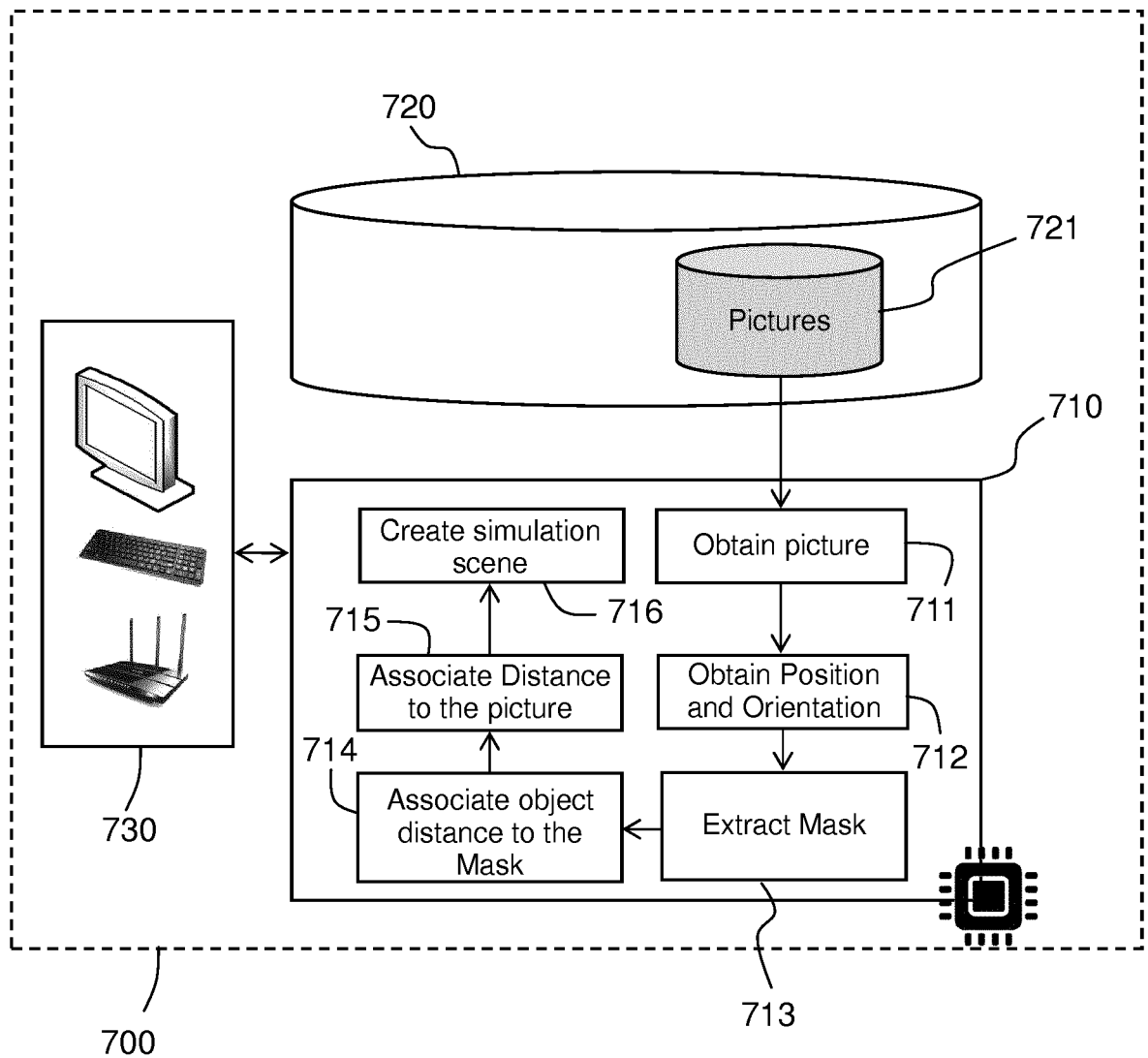
FIG. 7 displays an example of a device in a number of embodiments of the invention.

FIG. 7 displays an example of a device in a number of embodiments of the invention.

The device 700 is configured to create a digital simulation scene. To this effect, the device 700 comprise digital circuitry 710 configured to:
- obtain 711 at least one digital photographic image of a view of a 3D real space. For example, the device may comprise a storage media 220 comprising digital photographic pictures 221;
- obtain 712 a position and an orientation of the digital photographic image relative to a specified view point;
- extract 713 from the at least one digital photographic image at least one mask representing at least one object having a specified position in the 3D real space in the at least one digital photographic image;
- associate 714 to the mask an object distance between the specified view point and the object;
- associate 715 to the digital photographic image a distance higher than the object distance;
- create 715 a digital simulation scene comprising the digital photographic image and the mask.

The device 700 is provided by means of non-limitative example only, and a skilled man may easily identify other possible devices according to the invention. For example, the architecture may comprise input/output units 730 of the computing device, for example a screen, a keyboard and/or a router. The input and outputs can be used for example to represent a digital photographic image and superimpose synthetic representations of runways on top of the digital photographic images, in order to determine the position and orientation of the image.

Different embodiments are applicable to other parts of the device 700. For example, the storage media 720 comprising digital photographic pictures may be located in a remote device in connection with the device 700. Alternatively, the digital photographic pictures may be directly loaded from capture devices, for example cameras.

All embodiments discussed with respect to FIGS. 1 to 6b are respectively applicable to the device 700.

The examples described above are given as non limitative illustrations of embodiments of the invention. They do not in any way limit the scope of the invention which is defined by the following claims.

The invention claimed is:

1. A method comprising:
    obtaining at least one digital photographic image of a view of a three-dimensional (3D) real space;
    obtaining a position and an orientation of the at least one digital photographic image relative to a specified viewpoint;
    extracting from the at least one digital photographic image at least one mask representing at least one object having a specified position in the 3D real space in the at least one digital photographic image;
    associating to the at least one mask an object distance between the at least one object and the specified viewpoint;
    associating to the at least one digital photographic image a distance higher than the object distance; and
    creating a digital simulation scene comprising the at least one digital photographic image and the at least one mask,
    wherein obtaining the orientation of the at least one digital photographic image relative to the specified viewpoint comprises:
        retrieving geographical coordinates of at least one fixed element from a database;
        identifying the at least one fixed element in the at least one digital photographic image;
        generating a synthetic representation of the at least one fixed element;
        superimposing the synthetic representation on the at least one digital photographic image at a position depending on the geographical coordinates of said at least one fixed element, and geographical coordinates of the specified viewpoint; and
        modifying the position and/or the orientation of the at least one digital photographic image, and performing a comparison of respective positions of the at least one fixed element and the synthetic representation of the at least one fixed element in the at least one digital photographic image, until an output of the comparison defines that a stop criterion is met.

2. The method of claim 1, wherein obtaining the orientation of the at least one digital photographic image relative to the specified viewpoint comprises:
    detecting at least one position of the at least one fixed element in the at least one digital photographic image;
    detecting the orientation of the at least one digital photographic image according to:
    said geographical coordinates of said at least one fixed element;
    said geographical coordinates of the specified viewpoint; and
    said at least one position of said at least one fixed element in the at least one digital photographic image.

3. The method of claim 1, wherein associating to the at least one mask the object distance:
    obtaining at least one aerial or satellite digital photographic image of the 3D real space comprising the specified viewpoint and the at least one object;
    detecting the specified position of the at least one object in the 3D real space in the at least one aerial or satellite digital photographic image; and
    calculating the object distance according to the specified position of the at least one object and a position of the specified viewpoint in the at least one aerial or satellite digital photographic image, and a resolution of the at least one aerial or satellite digital photographic image.

4. The method of claim 1, comprising obtaining a plurality of digital photographic images of the view of the 3D real space forming a panorama around the specified viewpoint.

5. The method of claim 4, wherein said panorama is a 360 degree panorama.

6. The method of claim 1, comprising:
obtaining timed series of digital photographic images of the view of the 3D real space;
detecting the at least one object as having the specified position and a changing appearance over the timed series of digital photographic images; and
extracting from each digital photographic image of the timed series, timed masks representing the at least one object in each digital photographic image of the timed series.

7. The method of claim 6, further comprising forming an animated mask of the at least one object using the timed masks.

8. The method of claim 6, comprising:
creating an animated 3D object based on the timed masks; and
associating to the animated 3D object a distance between the specified viewpoint and the at least one object.

9. The method of claim 8, comprising:
retrieving a 3D prototype of the animated 3D object, a layout of said 3D prototype being defined by one or more parameters;
identifying values of said one or more parameters from the timed masks; and
adding to the digital simulation scene an instance of said animated 3D object as an application of the values of said one or more parameters to said 3D prototype.

10. The method of claim 1, comprising:
obtaining a plurality of digital photographic images of the view of the 3D real space, for each of the plurality of digital photographic images:
obtaining a descriptor of a viewing condition;
extracting a corresponding mask representing the at least one object; and
associating the descriptor to the corresponding mask representing the at least one object.

11. The method of claim 1, comprising:
determining a light source position and a light source color of a light source representing a sun based on shadows in the at least one digital photographic image; and
adding said light source having the light source color at the light source position in the digital simulation scene.

12. A device comprising digital circuitry and non-transitory storage media storing computer code instructions for execution by the digital circuitry that is configured to:
obtain at least one digital photographic image of a view of a three-dimensional (3D) real space;
obtain a position and an orientation of the at least one digital photographic image relative to a specified viewpoint;
extract from the at least one digital photographic image at least one mask representing at least one object having a specified position in the 3D real space in the at least one digital photographic image;
associate to the at least one mask an object distance between the specified viewpoint and the at least one object;
associate to the at least one digital photographic image a distance higher than the object distance; and
create a digital simulation scene comprising the at least one digital photographic image and the at least one mask;
wherein obtain the orientation of the at least one digital photographic image relative to the specified viewpoint comprises:
retrieve geographical coordinates of at least one fixed element from a database;
identify the at least one fixed element in the at least one digital photographic image;
generate a synthetic representation of the at least one fixed element;
superimpose the synthetic representation on the at least one digital photographic image at a position depending on the geographical coordinates of said at least one fixed element, and geographical coordinates of the specified viewpoint; and
modify the position and/or the orientation of the at least one digital photographic image, and performing a comparison of respective positions of the at least one fixed element and the synthetic representation of the at least one fixed element in the at least one digital photographic image, until an output of the comparison defines that a stop criterion is met.

13. A computer program product stored on a non-transitory computer storage medium and comprising computer code instructions, wherein the computer code instructions when executed by one or more processors are configured to perform the method of claim 1.

* * * * *